United States Patent Office 2,975,200
Patented Mar. 14, 1961

2,975,200

PREPARATION OF CUPROUS ALKYL MERCAPTIDES

Paul F. Warner, Phillips, Tex., assignor to Phillips Petroleum Company, a corporation of Delaware No Drawing. Filed May 22, 1958, Ser. No. 736,965

15 Claims. (Cl. 260—438)

This invention relates to the preparation of a cuprous alkyl mercaptide. In one of its aspects, the invention relates to the preparation of a cuprous alkyl mercaptide using an alkyl mercaptan and cuprous chloride under substantially anhydrous conditions. In a further aspect, the invention relates to a method of preparing a cuprous alkyl mercaptide by reacting an alkyl mercaptan and cuprous chloride under essentially anhydrous conditions at approximately room temperature with removal of hydrogen chloride which is evolved during the reaction according to the equation following:

$$RSH + CuCl \rightarrow RSCu + HCl$$

Cuprous alkyl mercaptides which possess utility as anti-fouling agents in paints which are applied to prevent or to discourage the accumulation of margine organisms, such as cuprous methyl mercaptide, cuprous isopropyl mercaptide, and generally lower alkyl mercaptides derived from an alkyl mercaptan containing from 1 to 16 carbon atoms have been prepared. For example, it has been disclosed to dissolve a mercaptan in benzene and to add such a solution to cupric acetate dissolved in water, stirring the mass for several hours following which there is obtained a precipitate which is filtered off, washed with water, benzene, ethanol and ether and dried overnight in a vacuum to obtain a cuprous mercaptide, specifically cuprous secondary-butyl mercaptide. It is also known that certain treating agents used in the treatment of gasoline containing stocks will convert mercaptan content thereof substantially to cuprous mercaptides. The mercaptides are substantially taken into said reagent which later therein are subjected to oxidation conditions to convert the mercaptides to corresponding disulfides and cupric chloride. Although the reagent, in this instance an aqueous glycol ether solution, can be separated from the copper mercaptide by distilling at a high vacuum to avoid decomposition of substantially all of the mercaptide, recovery in good yield is difficult, time consuming and expensive. It is known that mercaptides decompose at relatively low temperatures which are as low as about 170° F. It is also known in the well-known, so-called copper sweetening process that cuprous alkyl mercaptide can be obtained. There are involved at least three steps. In step 1, the treating solution produces the cuprous alkyl mercaptide and disulfide. The mercaptide is thus obtained admixed with disulfide. In the process, the mercaptide further reacts with copper ion to produce disulfide and copper ion of a different valence state. This copper ion then reacts with hydrogen ion and oxygen to reproduce the original copper ion and water. While these reactions are entirely satisfactory for sweetening gasoline or for production of disulfides, it will be noted that they are for economic reasons not well adapted to production of mercaptides, particularly in view of the formation of the disulfides. Only one mol of mercaptide is produced from two mols of mercaptan and, of course, the disulfide would have to be removed to produce a salable product.

It has now been found that, if cuprous chloride is added to the alkyl mercaptan under anhydrous conditions, there will result substantially complete conversion of the mercaptan and cuprous chloride to the copper alkyl mercaptide with formation and evolution of hydrogen chloride. The process is extremely simple since it is necessary merely to agitate together stoichiometric amounts of the copper salt and the mercaptan at approximately room temperature. Nitrogen can be bubbled through the mixture to agitate the same and to remove the hydrogen chloride which is evolved during the reaction. Any residual hydrogen chloride which is not completely removed from the reaction mixture can be removed by caustic washing or similar treatment, if desired. The mercaptide is recovered by filtration when it forms as a precipitate in excess of the mercaptan which ordinarily is used to facilitate the reaction. When the mercaptide is an oily liquid as in the case of cuprous tertiary-octyl mercaptide, the entire reaction mixture can be taken as product and no recovery method need be employed. When the product is a liquid, if desired, care can be taken to avoid the presence of an undesirable excess of the mercaptan. By carefully controlling the quantities used, substantially no excess mercaptan need be obtained in the product.

It is an object of this invention to produce cuprous alkyl mercaptides. It is another object of this invention to produce cuprous alkyl mercaptides in a one-step, easy to perform operation requiring no recovery treatment of substantial character. It is a further object of the invention to produce a cuprous alkyl mercaptide obtaining in the reaction mass no difficult-to-separate undesired by-product.

Other aspects, objects and the several advantages of the invention are apparent from a study of this disclosure and the appended claims.

According to the present invention, cuprous alkyl mercaptides, of which the alkyl radical contains from 1 to 16, inclusive, are prepare by the reaction of cuprous chloride, taken as a finely divided solid, with the corresponding mercaptans by admixing the reactants under substantially anhydrous conditions, by adding the finely divided cuprous chloride slowly to the mercaptan, preferably with agitation. The alkyl radical may be methyl, ethyl, propyl, isopropyl and normal, secondary and tertiary isomers of alkyl radicals which contain from 4 to 16, inclusive, carbon atoms per alkyl radical. Examples of these cuprous alkyl mercaptides are cuprous tertiary-butyl mercaptide, cuprous n-butyl mercaptide, cuprous secondary butyl mercaptide, cuprous n-amyl mercaptide, cuprous isoamyl mercaptide, cuprous secondary amyl mercaptide, cuprous tertiary-octyl mercaptide, cuprous dodecyl mercaptide, cuprous hexadecyl mercaptide, and cuprous tertiary dodecyl mercaptide.

The reaction is exothermic and hydrogen chloride gas is liberated. Nitrogen or other inert gas can be bubbled through the reaction mixture to perform the agitation and to aid in the evolution from the mass of the hydrogen chloride which is produced.

As noted, the reaction is conducted under substantially or essentially anhydrous conditions. Not more than about 1 weight percent of water can be tolerated since greater amounts will usually result in a very sticky mass of material which is extremely difficult to handle, for obvious reasons. Furthermore, water will precipitate the mercaptide when stoichiometric amounts of the cuprous chloride and the alkyl mercaptan are admixed.

It will be noted that the procedure of the present invention is extremely simple, requires no especial apparatus or handling methods and yields and easy-to-handle product. It is perhaps noteworthy that an attempt to prepare ferric mercaptides by the procedure of the present invention was not successful.

Example I

Seven hundred and ten grams of methyl mercaptan were chilled in a Dry-Ice acetone bath. Three hundred grams of finely divided cuprous chloride were slowly added to the chilled mercaptan. The chilled mercaptan was stirred during the addition of the cuprous chloride and until the reaction was complete. Upon completion of the reaction, the excess mercaptan and HCl were weathered off, leaving a bright yellow precipitate of cuprous mercaptide which was air dried. Three hundred and fifty-three grams of product were recovered.

Example II

Proceeding substantially as in Example I, 160 grams of cuprous chloride were added to 740 grams of tertiary-butyl mercaptan at room temperature. When evolution of HCl had ceased, excess mercaptan was removed by distillation leaving a yellowish-white product which was cuprous tertiary-butyl mercaptide.

Example III

Two hundred grams of cuprous chloride were added slowly with stirring to 438 grams of tertiary-octyl mercaptan, forming a heavy precipitate, and HCl was evolved. Normal heptane was added to dilute the mixture, thus obtained, and the temperature raised to 142° F. to complete the reaction. After reaction was complete, the mercaptide was filtered out and dried. The precipitate weighed 120 grams.

Example IV

Proceeding substantially as described in Example I hereof, 1.46 pounds of a cuprous chloride and 6 pounds of dodecyl mercaptan are added together obtaining the corresponding cuprous dodecyl mercaptide. The reaction was performed in a gallon bottle and nitrogen was bubbled through the mixture until all of the cuprous chloride was dissolved. HCl remaining in the product was removed by percolation of the orange-red liquid product which was obtained through subdivided calcium oxide.

Example V

Proceeding substantially as described in the foregoing Example IV, hexadecyl mercaptide was prepared using 6 pounds of the corresponding mercaptan and 1.1 pounds of cuprous chloride. The orange-red liquid obtained is treated as before in Example IV.

In both Examples IV and V, the red liquid is composed of approximately 50 percent mercaptide dissolved in the parent mercaptan. This liquid, according to the invention, can be used directly, emulsified with water, as a spray for treating both animal and vegetable life or organisms as these have been treated in the prior art with certain mercaptides.

Reasonable variation and modification are possible within the scope of the foregoing disclosure and the appended claims to the invention, the essence of which is that cuprous alkyl mercaptides are prepared under substantially anhydrous conditions by admixing subdivided cuprous chloride with an alkyl mercaptan.

I claim:

1. In the preparation of a cuprous alkyl mercaptide in which cuprous chloride and alkyl mercaptan are reacted, the improvement which comprises adding solid subdivided cuprous chloride to said alkyl mercaptan under substantially anhydrous conditions.

2. A preparation of a cuprous alkyl mercaptide according to claim 1 wherein the mercaptan contains 1 to 16 carbon atoms.

3. In the preparation of a cuprous alkyl mercaptide in which cuprous chloride and alkyl mercaptan are reacted, the improvement which comprises admixing solid subdivided cuprous chloride and an alkyl mercaptan in the presence of not more than about one percent of water.

4. A preparation of a cuprous alkyl mercaptide according to claim 3 wherein the mercaptan is a lower alkyl mercaptan.

5. A preparation according to claim 3 wherein the alkyl mercaptain contains 1–16 carbon atoms.

6. A preparation according to claim 3 wherein the alkyl mercaptan is n-butyl mercaptan.

7. A preparation according to claim 3 wherein the alkyl mercaptan is secondary butyl mercaptan.

8. A preparation according to claim 3 wherein the alkyl mercaptan is tertiary butyl mercaptan.

9. A preparation according to claim 3 wherein the alkyl mercaptan is n-amyl mercaptan.

10. A preparation according to claim 3 wherein the alkyl mercaptain is isoamyl mercaptan.

11. A preparation according to claim 3 wherein the alkyl mercaptan is secondary amyl mercaptan.

12. A preparation according to claim 3 wherein the alkyl mercaptan is tertiary-octyl mercaptan.

13. A preparation according to claim 3 wherein the alkyl mercaptan is dodecyl mercaptan.

14. A preparation according to claim 3 wherein the alkyl mercaptan is tertiary dodecyl mercaptan.

15. A preparation according to claim 3 wherein the alkyl mercaptan is hexadecyl mercaptan.

References Cited in the file of this patent

UNITED STATES PATENTS

| | | |
|---|---|---|
| 2,414,035 | Fox | Jan. 7, 1947 |
| 2,455,061 | Hoover | Nov. 30, 1948 |
| 2,533,744 | Skinner et al. | Dec. 12, 1950 |